United States Patent
Camp

[15] 3,692,047
[45] Sept. 19, 1972

[54] AUTOMATICALLY REGULATED FIRE VALVE

[72] Inventor: Alfred L. Camp, Brea, Calif.
[73] Assignee: Wilkins Regulators Co., Los Angeles, Calif.
[22] Filed: July 20, 1970
[21] Appl. No.: 56,558

[52] U.S. Cl. .................................................137/495
[51] Int. Cl. ..............................................F16k 31/14
[58] Field of Search ...............137/494, 495, 593

[56] References Cited

UNITED STATES PATENTS

| | | | |
|---|---|---|---|
| 1,302,538 | 5/1919 | Gulick | 137/413 |
| 1,897,517 | 2/1933 | Hughes | 137/495 |
| 1,984,792 | 12/1934 | Ford | 137/495 |
| 3,189,041 | 6/1965 | Hansen | 137/495 X |
| 3,273,589 | 9/1966 | Dollison et al. | 137/495 |
| 3,400,734 | 9/1968 | Rosenberg | 137/495 |
| 2,026,704 | 1/1936 | Petroe | 137/495 |

FOREIGN PATENTS OR APPLICATIONS

| | | | |
|---|---|---|---|
| 829,909 | 4/1938 | France | 137/495 |
| 587,408 | 4/1947 | Great Britain | 137/495 |

*Primary Examiner*—Henry T. Klinksiek
*Attorney*—Lyon & Lyon

[57] ABSTRACT

A valve for use in conjunction with a riser for supplying water, in case of fire, at all levels of a multiple story structure at a predetermined regulated pressure, the valve includes a diaphragm sensitive to pressure at the discharge side of the valve, tending to close the valve, a spring opposing the diaphragm, a normally inaccessible spring adjustment means, and a manually operated handle for overriding the spring and closing the valve without altering the adjustment means.

5 Claims, 3 Drawing Figures

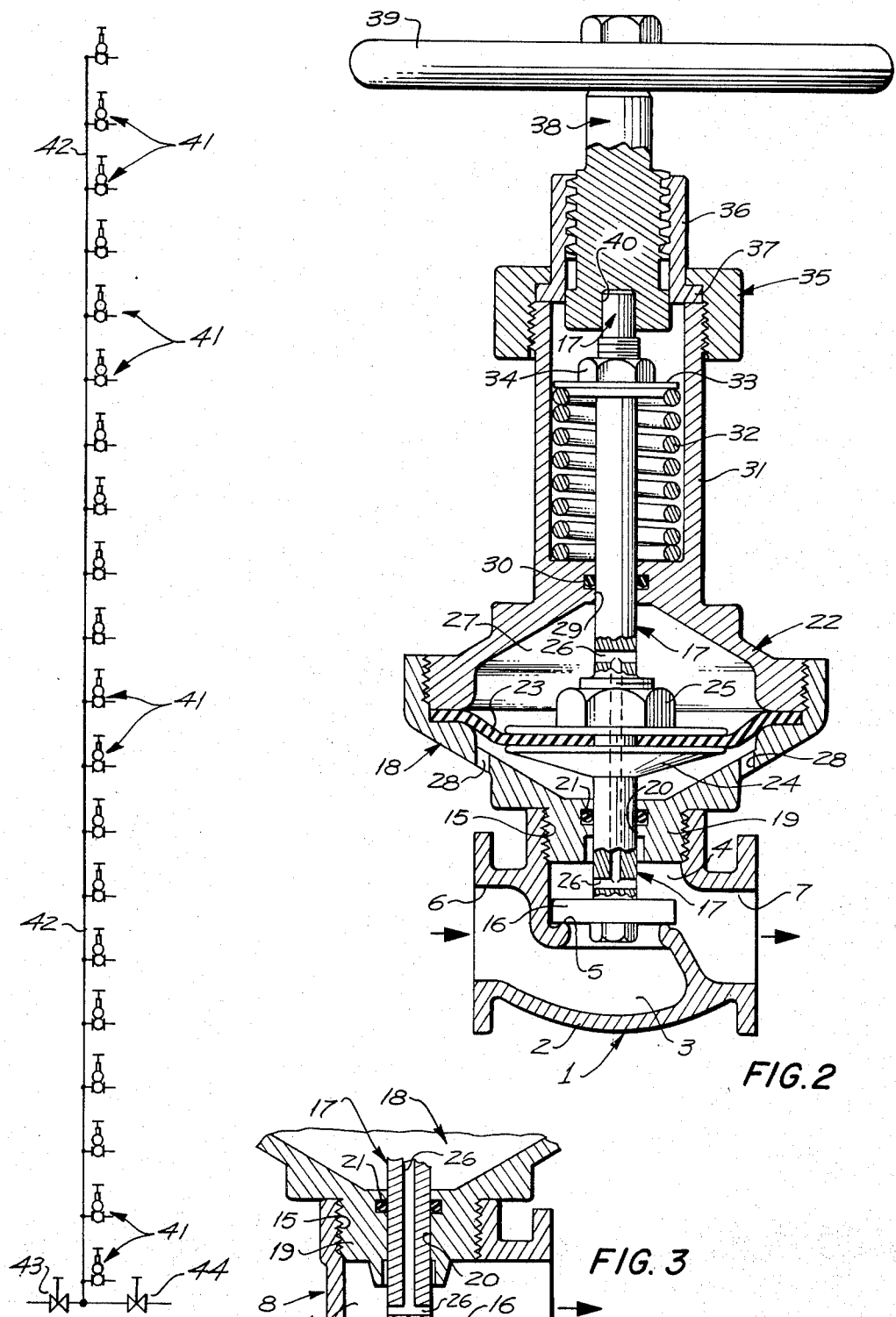

3,692,047

AUTOMATICALLY REGULATED FIRE VALVE

BACKGROUND OF THE INVENTION

It is necessary that multiple story buildings be equipped with one or more risers or vertical water supply pipes which are reserved for use in case of fire. Outlet valves are provided at each floor or selected floors. Normally, these risers are empty and have inlets at street level for connection to a water supply through the pumping equipment carried on the fire trucks in case the normal water supply is not available. In order that there be adequate pressure at the roof of the building, the pressure at ground level may be excessive. For example, a sixty story building may require a ground level pressure in excess of 300 pounds per square inch in order to maintain a suitable working pressure (in the order of 60 to 90 pounds per square inch) at roof level. Fire hoses, however, are usually limited to pressures in the order of 100 pounds per square inch so that the hose will not be too stiff to handle.

In order to control the pressure at various levels, the outlet valves are equipped with orifice plates to create a pressure differential sufficient to reduce the outlet pressure to the desired level. When the system is in operation and water is flowing through the orifice plates, the orifice plates are satisfactory; however, under static conditions when the hose nozzle is shut off, even if only of short duration, the orifice plates do not function with the result that the fire hose is subjected to the full static head. At the lower levels, the excessive pressure may rupture the hose, or increase the difficulty of manipulating the hose.

SUMMARY OF THE INVENTION

The present invention is directed to an automatically regulated fire valve, summarized in the following objects:

First, to provide a fire valve for installation at predetermined levels along a riser available to firemen, the fire valve including a manually adjustable shut off valve and a pressure regulating control operable only when the riser contains water.

Second, to provide a fire valve, as indicated in the preceding object, wherein the pressure regulating control is preset and sealed if desired, permitting the opening and closing of the shut off valve when needed, or in the course of test, without changing the setting of the pressure regulating control.

Third, to provide a fire valve, as indicated in the other objects, which is relatively inexpensive to manufacture and install, and because of its multiple functions may be installed on each floor to provide water at a predetermined pressure at each floor rather than providing a single regulated pressure for a group of floors.

DESCRIPTION OF THE DRAWINGS

FIG. 1 is a diagrammatical view, showing a vertically arranged series of automatically regulated fire valves.

FIG. 2 is a longitudinal sectional view of the automatically regulated fire valve, shown in its closed position and incorporating a straight through valve unit, wherein the inlet and outlet share a common axis.

FIG. 3 is a fragmentary sectional view, similar to FIG. 2, showing the automatically regulated fire valve adapted to an angle valve wherein the inlet and outlet are disposed 90° one from the other.

The automatically regulated fire valve includes a valve unit 1 which, as illustrated in FIG. 2, comprises a straight valve body 2, defining an inlet chamber 3 and an outlet chamber 4, separated by a port having a valve seat 5. The inlet and outlet chambers have, respectively, an inlet opening 6 and an outlet opening 7 which share a common axis.

The automatically regulated fire valve may utilize an alternative valve unit 8, comprising an angular valve body 9, having an inlet chamber 10 and an outlet chamber 11 in communication through an opening having a valve seat 12. The inlet and outlet chambers 10 and 11 have, respectively, an inlet opening 13 and an outlet opening 14 at right angles to each other.

Either valve unit, 1 or 8, includes an internally screwthreaded tubular extension 15 in coaxial relation with the valve seat 5 or 12. A valve head 16 engages the valve seat 5 or 12 and is provided with a valve stem 17 which extends through the tubular extension 15.

The tubular extension receives an essentially conical lower diaphragm housing 18, having an externally screwthreaded boss 19. The boss 19 is provided with an opening 20, which receives the valve stem 17, and is provided with a seal ring 21. The lower diaphragm housing 18 is joined at its periphery to an upper diaphragm housing 22, essentially in the form of an inverted cone.

Secured between the housings, by its periphery, is a diaphragm 23 through which the valve stem 17 extends. Below the diaphragm, the valve stem is provided with a flange 24, and above the diaphragm, the valve stem 17 is screwthreaded to receive a clamp nut 25. A passage 26 is provided within the valve stem 17 which communicates between the outlet chamber 4 or 11 immediately above the valve head 16 and the pressure chamber 27 formed between the diaphragm 23 and the upper diaphragm housing 22. The lower diaphragm housing 18 is provided with one or more vent openings 28.

The upper diaphragm housing 22 is provided with a central opening 29, having a seal ring 30. The valve stem 17 extends upwardly through the opening 29 into a spring housing 31, integral with the upper diaphragm housing 22 and extending upwardly therefrom. The spring housing 31 receives a spring 32 which surrounds the stem 17. The stem 17 receives a washer 33 and an adjustment nut 34 so that the spring is confined between the washer 33 and the lower end of the spring housing 31.

The upper end of the spring housing receives an internally screwthreaded clamp collar 35. Secured to the spring housing 31, by the clamp collar 35, is a sleeve 36, having a flange 37 at its lower end. As it is desired to secure the sleeve against rotation, the confronting ends of the sleeve and spring housing may be serrated or otherwise keyed. The sleeve 36 is internally screwthreaded to receive a correspondingly screwthreaded handle stem 38, having a handle 39 at its upper end. The lower end of the handle stem is provided with a socket 40, which receives and bears against the upper end of the valve stem 17, which projects above the adjustment nut 34.

It is intended that the automatically regulated fire valve, indicated generally by 41 in the diagrammatical view FIG. 1, be installed at each floor of a multiple story building, contiguous to a common riser 42. The lower end of the riser is provided with a valve 43 which is usually accessible externally of the building and is intended for connection to a pressure system carried by a fire truck. The riser may also be connected to the water supply internally of the building through a valve 44. Normally, the riser is empty; that is, the riser does not contain water except in case of fire or for purposes of conducting fire tests.

In order to provide adequate water pressure at the top of a multiple story building, the pressure at ground level, if unregulated, will be excessive; that is, too high for use of a fire hose. A fire hose in order to be maneuverable, is limited to water pressures in the order of 100 pounds per square inch. Actually, it is preferred that the working pressure be below this, in the order of 60 to 80 pounds per square inch. Assuming, for example, a building 600 feet high and that the static pressure of water is four-tenths of an inch per vertical foot, the pressure differential between the top of the building and ground level would be 240 pounds per square inch, and to provide a 60 pound per square inch pressure at the roof, the ground level pressure would be 300 pounds per square inch.

Operation of the automatically regulated fire valve is as follows:

Each valve is preadjusted for the pressure conditions desired at the particular floor at which the valve is mounted. This adjustment may be made at the factory or at the site where the valve is intended to be used. In either case, water is supplied to the particular valve at the static pressure corresponding to a selected floor. Previously, the sleeve 36 and handle stem 38 have been removed to expose the adjustment nut 34. The adjustment nut is turned to change the spring pressure until the pressure in the outlet chamber reaches a particular level, for example 60 pounds, if this is a desired operating pressure. This adjustment is accomplished by connecting a pressure gauge to the otherwise sealed outlet chamber. After this adjustment is made, the clamp collar 35 and handle stem are reattached to the valve and the valve is turned to its closed position, as shown in FIG. 2, whereupon a valve to be used at another floor level may be similarly adjusted. If this is done at the point of use, the water is subsequently drained from the riser.

It will be noted that operation of the handle 39 to open or close the valve has no effect on the adjustment. That is, when the valve is manually closed, the handle stem 38 overrides the upward force of the spring 32 on the valve stem 17. When the valve is manually opened, the force of the spring 32 maintains the valve stem 17 in contact with the handle stem 38 until the force of the spring balances the force exerted by the water in the pressure chamber 27.

Once installation and adjustment have been made, or checked if the adjustment was made prior to installation, the water is drained from the riser 42 and the valves 43 and 44 are closed. In the event of fire, and one or more of the fire valves are opened, the pressure in each fire hose will be essentially the same, irrespective of the level in the building in which the hose is required. It should be noted that normally the hose is used at essentially the same level as the valve to which it is attached.

While the invention has been shown in conjunction with a dry riser or stand pipe normally free of water, it may, without change, be used in conjunction with a wet riser or stand pipe.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A fire valve, comprising:
   a. a shut off valve defining an inlet chamber, an outlet chamber, a valve seat between said chambers, and a valve head engageable with the valve seat and a stem attached to the valve head and extending from the shut off valve;
   b. means responsive to pressure in the outlet chamber for urging the valve head toward its valve seat;
   c. a spring surrounding the extended portion of the valve stem, one end engaging a fixed abutment;
   d. an adjustment means on the extended valve stem engaged by the other end of the spring to urge the valve head from its valve seat in opposition to pressure in the outlet chamber, thereby tending to position the valve head so as to maintain a preselected pressure in the outlet chamber;
   e. and a manually operated means, accessible from outside said valve, releasably engageable with the extremity of the valve stem to force the valve head against its valve seat without change in the setting of the adjustment means.

2. A fire valve, as defined in claim 1, wherein:
   a. the pressure sensitive means includes a pressure chamber having a diaphragm wall;
   b. and the valve stem extends through the diaphragm and provides a passage equalizing the pressure in the outlet chamber and pressure chamber.

3. A plurality of valves as defined in claim 1; a generally upright fire control riser pipe; the valves of said plurality being connected to receive water from said riser pipe at respectively different levels thereof.

4. A fire valve, comprising:
   a. a valve body;
   b. a diaphragm housing joined to the valve body;
   c. a spring housing joined to the diaphragm housing;
   d. the valve body defining an inlet chamber and an outlet chamber and having a valve seat separating the chambers, and a valve stem extending therefrom through the diaphragm housing and spring housing;
   e. the diaphragm housing having a diaphragm forming a wall of a pressure chamber and joined to the valve stem;
   f. passage means communicating between the pressure chamber and outlet chamber thereby subjecting the diaphragm to the pressure in the outlet chamber for moving the valve head toward its valve seat;

g. a spring in the spring housing, one end of the spring engaging an abutment within the spring housing;
h. means also in the spring housing mounted on the valve stem for adjusting the spring, the force of the spring opposing the pressure applied to the diaphragm, thereby to produce a predetermined pressure in the outlet chamber;
i. a handle stem screwthreaded into the spring housing to engage the extremity of the valve stem to override the spring and to close the valve irrespective of the pressure in the outlet chamber and manually operable means outside said valve and secured to said handle stem.

5. A combination pressure regulating valve and shut off valve, comprising:
a. a valve housing defining an inlet chamber, an outlet chamber and a valve port therebetween having a valve seat facing into the outlet chamber;
b. a diaphragm housing defining a diaphragm chamber, a first bore communicating with the outlet chamber and confronting the valve seat; and a second, coaxial bore at its other end;
c. a valve assembly including a stem sealingly received in both bores and having a first portion extending into the outlet chamber and a second portion extending beyond the second bore, said second portion having a screwthreaded section; a head on the first portion of the stem engaging the valve seat; and a diaphragm dividing the diaphragm chamber into a first portion having the first bore and ported to atmosphere, and a second portion, the stem having a passage communicating between the second chamber portion and the outlet chamber whereby pressure in the outlet chamber and pressure in the second chamber portion exerts a closing force on the valve head;
d. a spring housing continuing from the diaphragm housing and surrounding the second portion of the stem;
e. a spring disposed in the spring housing;
f. an adjustment means screwthreaded on the second portion of the stem for engagement with the spring to provide an adjustable force opposing pressure when present in the outlet chamber thereby to prevent pressure in the outlet chamber from rising beyond a preselected value;
g. a screwthreaded sleeve secured to the spring housing;
h. and an exposed manually operated handle stem received in the sleeve for abutting engagement with the extremity of the valve stem for closing the valve port irrespective of the setting of the adjustment means.

* * * * *